(12) United States Patent
Anabuki

(10) Patent No.: US 9,374,522 B2
(45) Date of Patent: Jun. 21, 2016

(54) VIDEO GENERATING APPARATUS AND METHOD

(71) Applicant: CANON KABUSHIKI KAISHA, Tokyo (JP)

(72) Inventor: Mahoro Anabuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 605 days.

(21) Appl. No.: 13/682,986

(22) Filed: Nov. 21, 2012

(65) Prior Publication Data

US 2013/0141607 A1    Jun. 6, 2013

(30) Foreign Application Priority Data

Dec. 1, 2011    (JP) ................................. 2011-263512

(51) Int. Cl.
H04N 5/232    (2006.01)

(52) U.S. Cl.
CPC ........... *H04N 5/23219* (2013.01); *H04N 5/232* (2013.01); *H04N 5/23216* (2013.01); *H04N 5/23293* (2013.01)

(58) Field of Classification Search
CPC .................................................. H04N 5/23219
USPC .................... 348/77, 78, 14.16; 434/256–259
See application file for complete search history.

(56) References Cited

U.S. PATENT DOCUMENTS

| | | | |
|---|---|---|---|
| 8,328,691 B2* | 12/2012 | Lanfermann et al. | 482/1 |
| 8,496,563 B2 | 7/2013 | Komatsu et al. | |
| 8,911,328 B2* | 12/2014 | Alessandri et al. | 482/8 |
| 2008/0297589 A1* | 12/2008 | Kurtz et al. | 348/14.16 |
| 2010/0022351 A1* | 1/2010 | Lanfermann et al. | 482/1 |
| 2010/0088023 A1 | 4/2010 | Werner | |
| 2013/0171601 A1* | 7/2013 | Yuasa et al. | 434/258 |

FOREIGN PATENT DOCUMENTS

| | | |
|---|---|---|
| CN | 101713660 A | 5/2010 |
| CN | 101791466 A | 8/2010 |
| JP | 3472238 A | 12/2003 |
| JP | 2004-229109 A | 8/2004 |
| JP | 2006-259929 A | 9/2006 |
| JP | 2007-289515 A | 11/2007 |
| JP | 2009-077896 A | 4/2009 |

(Continued)

OTHER PUBLICATIONS

Nov. 15, 2014 Chinese Office Action in a foreign counterpart Chinese Patent Application No. 201210527575.X.

*Primary Examiner* — Paulos M Natnael
(74) *Attorney, Agent, or Firm* — Fitzpatrick, Cella, Harper & Scinto

(57) ABSTRACT

A video generating apparatus comprises: an obtaining unit for obtaining an image in which a person has been taken; a human body recognizing unit recognizing a part of a human body of the person in the image; a holding unit for holding data concerning a basic video showing that the person exercises; a setting unit for setting a motion range of a specific part in the exercise of the person, on the basis of the recognized parts of the human body of the person; a video generating unit for generating, from the data concerning the basic video, a sample video for the person in the image on the basis of the motion range; and a display controlling unit for displaying the generated sample video on a displaying apparatus. Thus, it is possible to generate and show the sample video suitable for the person.

20 Claims, 5 Drawing Sheets

(56) References Cited

FOREIGN PATENT DOCUMENTS

| | | |
|---|---|---|
| JP | 2009-213782 A | 9/2009 |
| JP | 2009-277195 A | 11/2009 |
| WO | 2007/111907 A2 | 10/2007 |
| WO | 2009/107714 A1 | 9/2009 |
| WO | 2011/074206 A1 | 6/2011 |

* cited by examiner

VIDEO GENERATING APPARATUS AND METHOD

BACKGROUND OF THE INVENTION

1. Field of the Invention

The present invention relates to video generating apparatus and method, and, more particularly, to a technique which is suitably used to generate a sample video of an exercise or the like.

2. Description of the Related Art

There are many cases where exercises serve as useful health promotion measures such as a measure to improve a frozen shoulder, a measure to strengthen the muscles of leg and waist, a measure to eliminate a metabolic syndrome, and the like. However, it is not enough to merely do exercise even in these cases. Namely, it is important to appropriately select exercise programs and loads according to conditions of a user's body. Under the circumstance, there are professionals such as a physical therapist, a healthy exercise educator and the like for teaching and instructing such appropriate exercises.

In case of teaching an exercise, to show a sample exercise as video is intuitive and enables easy understanding. For this reason, many physical therapists and healthy exercise educators widely use sample video of exercises at the scene of teaching. However, there is no exercise which serves as a useful sample for everyone. That is, there are many kinds of ways of properly moving a body and putting loads on a body according to ability and condition of a person who intends to do the exercise. It is better that the sample video to be presented to the person doing the exercise is suitable for the ability and the condition of the relevant person. However, as a practical matter, it is troublesome and costly to form a sample video independently for each person. Consequently, for example, in a case where a more careful exercise is required as in a case of rehabilitation to recover from injury, the sample video is used merely as a guide. As a result, in fact, the physical therapists, the healthy exercise educators and the like teach and instruct the exercises painstakingly and carefully.

In this context, Japanese Patent Application Laid-Open No. 2009-213782 discloses a technique of generating and presenting a sample video which is suitable for the ability of a person who performs an exercise (i.e., an exerciser). In this technique, the exerciser exercising while watching a sample video is taken by a camera, and it is judged based on an obtained video whether or not the exerciser can follow a sample exercise. Then, when it is judged that the exerciser cannot follow the sample exercise, an exercise level of the sample video is decreased and/or displaying speed is decreased. Thus, it is possible by using this technique to present the sample video showing an exercise quantity suitable for the ability of the exerciser.

Likewise, Japanese Patent No. 3472238 discloses a technique of presenting a sample video suitable for a condition of an exerciser. In this technique, if information indicating a body site that the exerciser intends to tone up, or a body site to which function recovery is required by the exerciser is input, an exercise program in which a quantity of calories to be spent or the like is used as an index is created, and a sample of the suitable exercise is presented by using a human body model. Thus, it is possible in this technique to present the sample video showing a quantity of exercise suitable for the condition (wish) of the exerciser.

However, in the above known techniques, it is impossible to generate and present a sample video showing a pose which is suitable for the ability and the condition of the exerciser.

For example, in the rehabilitation which aims to improvement of the frozen shoulder, the exercise is performed so as to gradually and largely move the shoulder to the extent that the exerciser can. However, even in such a case, it is necessary for the exerciser to effortlessly move the shoulder within the range that the exerciser does not feel a pain. That is, the range in which the shoulder can be moved is different for each exerciser. In the technique disclosed in Japanese Patent Application Laid-Open No. 2009-213782, the content of the sample video is determined according to whether the exerciser can follow the sample video. Consequently, if the exerciser forcedly follows the sample video showing that the shoulder is largely moved, the improper sample video by which the exerciser has to continue the improper exercises is resultingly generated and presented. For this reason, the technique disclosed in Japanese Patent Application Laid-Open No. 2009-213782 is improper to present the sample video which is suitable for the pose (not the quantity of the exercise) of the exerciser.

Moreover, it has been known that, in a squat exercise which is effective for strengthening a muscle of a lower body, there are several variations such as a method of bending a knee while keeping a back vertical, a method of bending a knee while slightly inclining a back forward without forcedly bending the back, and the like. Apparently, what kind of squat exercise should be used is different according to a condition of the exerciser. For example, it is effective for a person who does not have a pain in his/her knee to adopt the method of deeply bending the knee to the extent that his/her thigh becomes parallel to a floor while keeping the back vertical. On the other hand, it is effective for a person who has a pain in his/her knee to adopt the method of slightly bending the knee while slightly inclining the back to the extent that he/she does not feel a pain. Further, it is preferable for a person who feels a pain in his/her waist to keep his/her back vertical rather than to incline the back forward. However, even in such a condition, when the relevant person does not feel a pain in the waist, it is better for him/her to slightly bend the knee. For these reasons, it is impossible to properly determine the exercise (pose) only by merely designating the body site with use of the technique disclosed in Japanese Patent No. 3472238.

In this connection, in a case where the technique disclosed in Japanese Patent No. 3472238 is developed, there is a possibility of enabling to generate and present an exercise sample showing a more appropriate pose not only by merely inputting the body site that the exerciser intends to harden but also by inputting the joint that the exerciser feels a pain, the extent of the pain, and the like. However, as the exerciser intends to more properly set the contents of the exercise, the number of information to be input previously becomes large, whereby it takes time to input the relevant information.

SUMMARY OF THE INVENTION

The present invention aims to be able to generate and present a sample video showing a pose suitable for an exerciser (i.e., a person who exercises) with small time and effort.

To achieve such an object, a video generating apparatus of the present invention is characterized by comprising: an obtaining unit configured to obtain an image in which a person has been taken; a human body recognizing unit configured to recognize a part of a human body of the person in the image; a holding unit configured to hold data concerning a basic video showing that the person exercises; a setting unit configured to set a motion range of a specific part in the exercise of the person, on the basis of the recognized parts of the human body of the person; a video generating unit configured to generate, from the data concerning the basic video, a sample video for the person in the image on the basis of the motion range; and a display controlling unit configured to display the generated sample video on a displaying apparatus.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the attached drawings.

[First Embodiment]

In an example according to the first embodiment to be described hereinafter, initially, a professional such as a physical therapist or a healthy exercise educator takes and inputs an image of a reference pose of an exerciser or a person who exercises (hereinafter, called a user) during an exercise, which the pose is set in consideration of the ability and the condition of the user. Then, a sample video showing the content suitable for the user is generated and presented based on the input image. Generally, when the physical therapist or the healthy exercise educator teaches the content of an exercise to the user, he/she causes the user to actually hold an appropriate pose while directly helping the user. In the present embodiment, the image of the pose of the user at that time is taken, the pose in the taken image is recognized, the sample video according to the recognized pose in the image is generated by properly editing a previously-held basic video, and the generated sample video is presented. In addition, if the image of the pose of the user is taken while the user is exercising and the taken image is recognized, it is possible to properly change and present the sample video according to the pose in the exercise.

A sample video generating apparatus according to the present embodiment is placed in, for example, an operation room, a rehabilitation room or the like of an orthopedic department, a rehabilitation department or the like of a hospital, and is utilized by a patient (hereinafter, called a user) who uses of the room under the teaching of physical therapist. In the sample video generating apparatus according to the present embodiment, a sample video showing a rehabilitation exercise for a shoulder joint is generated and presented for a person who cannot freely rotate his/her shoulder due to a frozen shoulder.

(Constitution)

Figure 1:
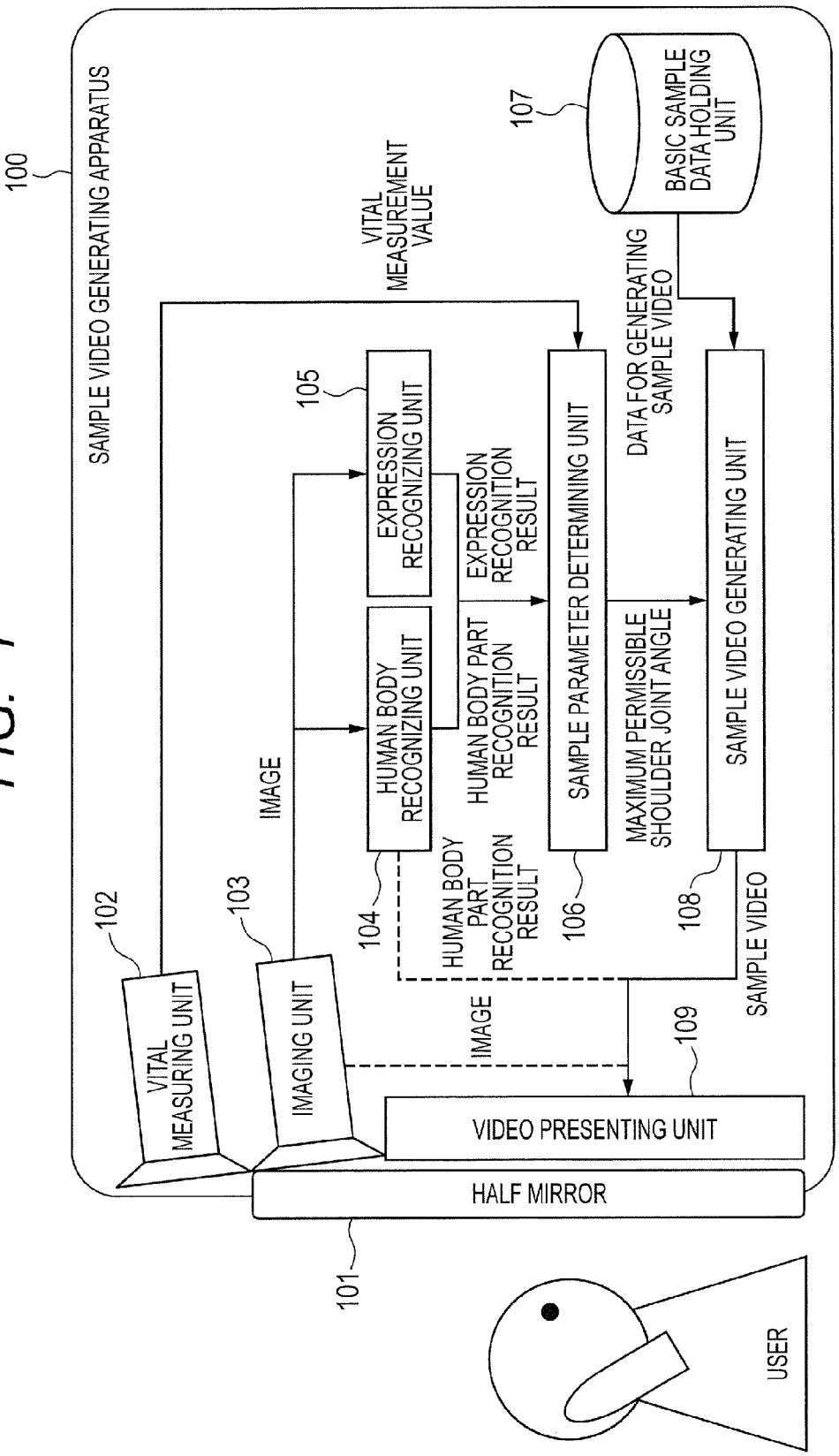
FIG. 1 is a block diagram illustrating an example of the constitution of a sample video generating apparatus according to the first embodiment of the present invention.

FIG. 1 is a block diagram illustrating an example of the constitution of a sample video generating apparatus 100 according to the present embodiment.

As illustrated in FIG. 1, the sample video generating apparatus 100 according to the present embodiment comprises a half mirror 101, a vital measuring unit 102, an imaging unit 103, a human body recognizing unit 104 and an expression recognizing unit 105. Further, the sample video generating apparatus 100 comprises a sample parameter determining unit 106, a basic sample data holding unit 107, a sample video generating unit 108 and a video presenting unit 109.

The imaging unit 103 and a displaying apparatus corresponding to the video presenting unit 109 are disposed at the back of the half mirror 101. Thus, when a user stands (or sits) in front of the half mirror 101, an image including a user's pose can be taken by the imaging unit 103 through the half mirror 101. Further, a video on the video presenting unit 109 is presented to the user standing (or sitting) in front of the half mirror 101 through this mirror.

The vital measuring unit 102 is a sensor which measures, in a contactless manner, a vital value of the user standing in front of the half mirror 101. Here, it should be noted that the vital value in this case is indicated by, e.g., a body temperature (cutaneous temperature) of the user. A sensor which measures the body temperature by detecting an infra-red ray generated by heat of the human body is generally known as the sensor which measures the body temperature in the contactless manner. Therefore, the known sensor like this is used as the vital measuring unit 102 in the present embodiment. Further, when measuring the body temperature, it may be possible to measure the body temperature of a specific part of the human body, or to measure the body temperatures of the specific parts of the human body and then form a body temperature map of the whole of the human body. Then, the vital measuring unit 102 transfers information indicating the measured vital value to the sample parameter determining unit 106. Incidentally, a degree of sweating, a volume of blood flow or the like may be used as another measurement value.

The imaging unit 103 is a camera for taking an image of the whole body of the user standing in front of the half mirror 101. As the imaging unit 103, it may be possible to use a camera capable of taking a two-dimensional visible image, a camera capable of taking a three-dimensional distant image, or a camera capable of taking both two-dimensional and three-dimensional images. In response to an operation on a not-illustrated user interface, the imaging unit 103 can explicitly take an image of the user's pose at a certain moment or continuously take images of the states of the user standing in front of the half mirror 101.

Here, the not-illustrated user interface includes, for example, a switch, a keyboard or the like which is connected to the imaging unit 103. In addition, a voice interface which interfaces the user with the imaging unit 103 by recognizing a voice recorded through a connected microphone may be used, and a gesture interface which interfaces the user with the imaging unit 103 by recognizing the taken video. Besides, the user interface may be operated by the user oneself standing in front of the half mirror 101, or by the physical therapist teaching the user how to exercise beside the user.

Incidentally, the imaging unit 103 may be constituted to be able to take an image without any explicit operation by the user, the physical therapist or the like. For example, after an explicit operation is once performed by the user or the physical therapist, the imaging unit 103 may continuously take the images as a moving image. Alternatively, the imaging unit 103 may have a moving body detecting function, and thus take an image every time a moving image is detected within a certain taking range by the moving body detecting function. In this case, the moving image is taken while the user is moving. Then, the imaging unit 103 transfers the taken image to the human body recognizing unit 104 and the expression recognizing unit 105. Incidentally, there are some cases where the image taken by the imaging unit 103 is transferred to the video presenting unit 109.

The human body recognizing unit 104 recognizes the position of the part of the human body of the person in the image transferred from the imaging unit 103. Here, the position of the part of the human body may be two-dimensionally recognized as the position on the image surface or three-dimensionally recognized as the position in a real space. When two-dimensionally recognizing the position of the part of the human body, for example, the human body recognizing unit 104 searches for an image feature originating in the previously prepared part of the human body, from the image (two-dimensional visible image) transferred from the imaging unit 103.

Incidentally, the parts of the human body include, e.g., a face, a head, a hand, an arm, a foot, a knee, a shoulder, a waist, a chest, a navel, a back and the like. A video feature of each of these parts is different according to a direction in which an image of the corresponding part is taken. For this reason, with respect to, e.g., the face, a plurality of video features are prepared for the respective directions such as a front face part, a profile part, a downward face part, and the like, and the necessary video feature is searched among them. As the image feature, an HOG (Histograms of Oriented Gradients) feature quantity or the like which is the feature quantity obtained by making a histogram of features in an inclination direction in a local area is used. The image feature originating in each of the parts of the human body is determined by collecting many images including the relevant part and statistically studying the matter common to the feature quantities included in the collected images with use of an algorithm called "Boosting" for instance. When the image feature originating in each of the parts of the human body determined like this is searched from the image received from the imaging unit 103, it is recognized that the relevant part of the human body is in the position where the feature was searched. Incidentally, it may be possible to recognize the position of the part of the human body by another known method.

When three-dimensionally recognizing the position of the part of the human body, a human body area is first specified by performing segmentation to the image (three-dimensional distant image) received from the imaging unit 103. For example, an area having the size substantially corresponding to that of the human body standing at the position apart from the half mirror 101 by about 1 m to 2 m is cut out. Then, a previously prepared human body model is applied to the specified human body area while changing the necessary positions of the parts of the human body model. When the human body model can be appropriately applied to the human body area, the position of the part of the human body in the human body model is given as a recognition result. Incidentally, it may be possible to recognize the position of the part of the human body by another known method.

Here, when both the two-dimensional visible image and the three-dimensional distant image are received from the imaging unit 103, it may be possible by the human body recognizing unit 104 to recognize the positions of the two human body parts based on both the received two images. In this case, to prevent a contradiction between the recognition result of the former two-dimensional human body part position and the recognition result of the latter three-dimensional human body part position, the recognition result of the latter three-dimensional human body part position is corrected so as to recognize the three-dimensional human body part position more correctly.

Although the methods of recognizing the positions of the human body parts have been described as above, the present invention is not limited to these methods. Namely, it may be of courser possible to use another known method. Then, the human body recognizing unit 104 transfers the recognition result to the sample parameter determining unit 106. Incidentally, there are some cases where the recognition result is transferred also to the video presenting unit 109.

The expression recognizing unit 105 recognizes, from the expression of the user in the image transferred from the imaging unit 103, whether or not the user feels a pain, and, when the user feels the pain, further recognizes how much the user feels the pain.

In the recognition process, the expression recognizing unit 105 first specifies an area where the image feature originating in the face of the user is detected, from the image received from the imaging unit 103. Here, as the feature quantity of the image feature, the HOG feature quantity or the like may be used. Subsequently, the expression recognizing unit 105 recognizes to which of a plurality of image groups including expressions respectively classified according to levels of pains and how much the image obtained by normalizing the specified area is similar. Here, the plurality of the image groups include images of collected expressions classified based on levels of pains such as an expression that a person feels an extreme pain, an expression that a person feels a pain in an endurable range, an expression that a person feels a slight pain, an expression that a person does not feel a pain, and the like.

Besides, a judgment axis for sorting a face image group class corresponding to the expression that the person feels the extreme pain and a face image group class corresponding to the expression that the person does not feel the pain is previously formed using an LDA (Linear Discriminant Analysis) method. Then, it is judged by using the judgment axis to which class the normalized image area is similar. By repeatedly performing this process in regard to comparisons of a plurality of expression classes, it is possible to recognize to which of the expressions previously prepared by the levels of the pains and how much the expression of the person in the image area received from the imaging unit 103 is similar.

Although the methods of recognizing the expressions that the persons feel the pain have been described as above, the present invention is not limited to these methods. Namely, it may be of courser possible to use another known method. Then, the expression recognizing unit 105 transfers the recognition result to the sample parameter determining unit 106.

The sample parameter determining unit 106 receives the information of the vital value indicating the body temperature from the vital measuring unit 102, the recognition result of the human body part from the human body recognizing unit 104 and the recognition result of the expression from the expression recognizing unit 105, and then generates a parameter necessary for generating the sample video based on the received information.

For example, when the sample video showing the rehabilitation exercise for the shoulder joint for the person who cannot freely rotate his/her shoulder due to the frozen shoulder is generated and presented, information indicating a maximum permissible shoulder joint angle which is permitted for the user is generated as the parameter for generating the sample video. Here, the shoulder joint angle is equivalent to an angle between the extended arm and the side surface of the body. Namely, the shoulder joint angle in the state that the user has lowered the arm is 0 degrees, the shoulder join angle in the state that the user has stretched the arm at his/her side is 90 degrees, and the shoulder join angle in the state that the user has extended the arm upward from the side is 180 degrees. In the rehabilitation exercise for improving the frozen shoulder, training for enlarging the shoulder joint angle within a reasonable range is performed according to the ability and the condition of the user. Here, the maximum permissible shoulder joint angle which is permitted for the user indicates this reasonable range.

The sample parameter determining unit 106 calculates the shoulder joint angle of the user in the image taken by the imaging unit 103, based on the recognition result of the human body part received from the human body recognizing unit 104, and sets the calculated angle as a reference value of the maximum permissible shoulder joint angle which is permitted for the user. For example, the sample parameter determining unit 106 calculates, based on the recognition result of the human body part received from the human body recognizing unit 104, an angle between a vector which joins the position of the shoulder and the position of the fingers included in the recognition result of the human body part and a vector which joins the position of the shoulder and the position of the waist (pelvis) on the side same as that of the shoulder. The calculated angle may include an angle two-dimensionally calculated on the image surface, or an angle three-dimensionally calculated based on the position of the three-dimensional human body part. In any case, the calculation to be performed here is not calculation to which accuracy is necessary but is calculation which merely obtains reference numerical values.

Since the calculated reference value is calculated based on the pose of the user in the image taken by the imaging unit 103, it is apparent that the state that the user could actually extend the arm upward is reflected in the calculated reference value. Thus, the sample parameter determining unit 106 can set the calculated reference value directly as the maximum permissible shoulder joint angle indicating the reasonable range. On the other hand, it is supposed, as one of operations, that the physical therapist actually teaching beside the user how to exercise causes the user to extend the arm upward up to the maximum permissible shoulder joint angle permitted to the user on the basis of various judgments, and takes the image of such a pose of the user by the imaging unit 103. Even in this case, it can be said that the pose of the user in the image taken by the imaging unit 103 reflects the state that the user has extended the arm upward up to the reasonable range permitted to the user.

Figure 2:
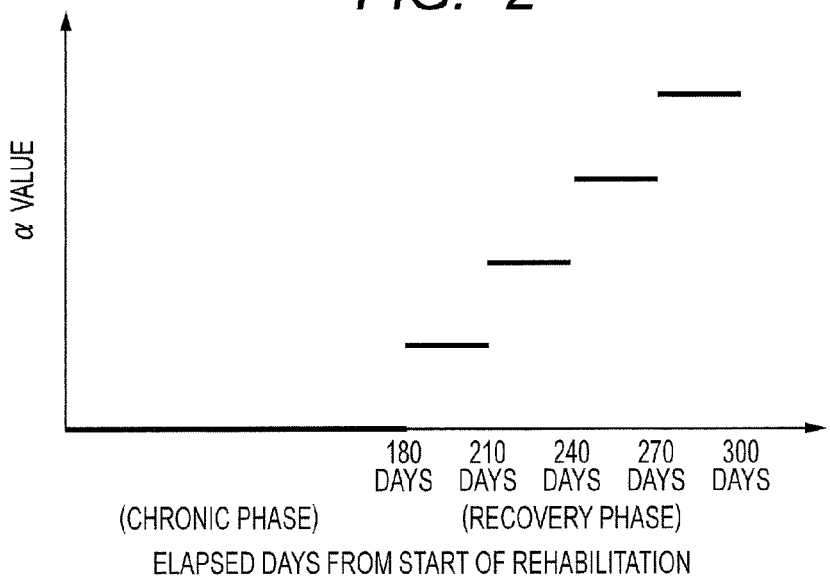
FIG. 2 is a diagram illustrating an example of a correspondence model of elapsed dates of rehabilitation and an α value.

Of course, the sample parameter determining unit 106 need not use the reference value as the maximum permissible shoulder joint angle directly. For example, in a phase which is called a recovery phase in which sufficient days have elapsed from the start of rehabilitation, it is necessary to positively widen the shoulder joint angle. In this phase, the sample parameter determining unit 106 may set "the reference value+ $\alpha$" as the maximum permissible shoulder joint angle so as to permit an angle which is wider than the reference value in which the state that the user could actually extend the arm upward has been reflected. Here, when the elapsed days from the start of the rehabilitation are input by the physical therapist or the user oneself through a not-illustrated user interface, it is possible by the sample parameter determining unit 106 to determine the value of $\alpha$ by referring to, for example, an internally provided correspondence model of the elapsed days of the rehabilitation and the value of $\alpha$ as illustrated in FIG. 2.

Besides, the sample parameter determining unit 106 may determine the value of $\alpha$ on the basis of the body temperature which is the vital value received from the vital measuring unit 102. That is, it is possible to judge that the muscle around the shoulder is more sufficiently loosened when the measured value of the body temperature around the shoulder of the user received from the vital measuring unit 102 is higher. Therefore, the value of $\alpha$ is set to be sufficiently high in this case. For example, when the muscle has been loosened and the body temperature has been increased due to a warm-up exercise or the like, the maximum permissible shoulder joint angle is determined as a larger value according to the increase of the body temperature. On the other hand, when the muscle has not been loosened sufficiently and the body temperature has not been increased sufficiently, the maximum permissible shoulder joint angle is determined as a smaller value.

Further, the sample parameter determining unit 106 may determine the value of $\alpha$ on the basis of the recognition result of the expression received from the expression recognizing unit 105. That is, it is possible, from the recognition result of the expression received from the expression recognizing unit 105, to judge that the pose of the user in the image taken by the imaging unit 103 is more reasonable when the expression that the user does not feel the pain is more noticeable. Therefore, the value of $\alpha$ is set by the sample parameter determining unit 106 to be sufficiently high. On the other hand, it is possible, from the recognition result of the expression received from the expression recognizing unit 105, to judge that the pose of the user in the image taken by the imaging unit 103 is more unreasonable when the expression that the user feels the pain is more noticeable. Therefore, the value of $\alpha$ is set by the sample parameter determining unit 106 as a minus value. As just described, in a case where the user excessively struggles with the expression that the user feels the pain when the image of the pose of the user is taken by the imaging unit 103, the maximum permissible shoulder joint angle is determined according to the recognition result so as to cause the user to exercise reasonably. When the vital measuring unit 102 and the expression recognizing unit 105 input the information concerning the states of the user as described above, the value of $\alpha$ reflects the input information.

Incidentally, it is assumed that the correspondence relations between the elapsed days from the start of the rehabilitation, the vital measurement value and the expression recognition result and the value of $\alpha$ are determined in advance. However, since the magnitude of the proper value of $\alpha$ is different for each user, it is assumed that the correspondence relation can be finely adjusted previously. For example, it is possible to finely adjust excess and deficiency of the value of $\alpha$ before a subsequent exercise according to the opinion of the user who exercised while watching the sample video presented according to the present embodiment and the judgment by the physical therapist who observed the relevant exercise. When the parameter of the maximum permissible shoulder joint angle is determined, the sample parameter determining unit 106 transfers the information of the determined parameter to the sample video generating unit 108.

The basic sample data holding unit 107 holds and stores therein the data for generating the sample video to be presented to the user. For example, the data of the basic video obtained by taking the state a person repeatedly performs an exercise of stretching the arm at the side from the put-down position, extending the arm upward, stretching the arm at the side, and then lowering the arm to the put-down position has been stored in the basic sample data holding unit 107. Further, in the sample video, the shoulder joint angle of the person has been added as a tag to each frame of the video. Furthermore, it is assumed that the tag (shoulder joint angle) has been added based on the recognition process of the position of the human body part same as that achieved by the human body recognizing unit 104. In another instance, the basic sample data holding unit 107 may hold and store, as the data for generating the sample video, motion data indicating the exercise of stretching the arm at the side from the put-down position, extending the arm upward, stretching the arm at the side, and then lowering the arm to the put-down position. In any case, the data like this for generating the sample video is referred by the sample video generating unit 108.

The sample video generating unit 108 receives the information indicating the maximum permissible shoulder joint angle from the sample parameter determining unit 106, refers to the data for generating the sample video from the basic sample data holding unit 107, and actually generates the sample video by using both the data.

Initially, a case where the data for generating the sample video is a sample video obtained by taking an image of a person who performs an exercise serving as a sample will be described. In this case, the sample video generating unit 108 compares the information of the maximum permissible shoulder joint angle received from the sample parameter determining unit 106 and the information of the shoulder joint angle added as the tag to each frame of the basic video received from the basic sample data holding unit 107 with each other. Then, only the frame in which the shoulder joint angle indicated by the tag is smaller than the maximum permissible shoulder joint angle is extracted, and the extracted frames are coupled together. Thus, the video which is composed of a part of the basic video is generated. In the generated video, the scene showing that the person extends the arm upward beyond the maximum permissible shoulder joint angle included in the video held by the basic sample data holding unit 107 has been removed. The sample video generating unit 108 transfers the obtained video to the video presenting unit 109 as the sample video.

Next, a case where the data for generating the sample video is motion data indicating an exercise serving as a sample will be described. In this case, the sample video generating unit 108 extracts only a portion showing that the shoulder joint angle does not exceed the maximum permissible shoulder joint angle received from the sample parameter determining unit 106, from the motion data held in the basic sample data holding unit 107. Then, the sample video generating unit 108 generates a CG (computer graphics) video showing that the exercise serving as the sample is performed by a human body model, by applying the extracted motion data to the CG human body model. Thus, the motion in which the portion showing that the person extends the arm upward beyond the maximum permissible shoulder joint angle included in the motion data held by the basic sample data holding unit 107 has been removed is generated as the CG video. The sample video generating unit 108 transfers the obtained CG video to the video presenting unit 109 as the sample video.

The video presenting unit 109 receives the sample video from the sample video generating unit 108, and performs display control to present the received sample video. Since the video presenting unit 109 is disposed in back of the half mirror 101, the user standing in front of the half mirror 101 watches the sample video overlapping the mirror image including the user oneself in the half mirror 101.

At this time, the video presenting unit 109 may adjust the presentation position (display position) of the video so that the positions of both the shoulders of the person image in the presented sample video overlap both the shoulders of the mirror image of the user. In this case, it is assumed that the video presenting unit 109 has obtained the information indicating the human body sizes of the user such as the height, the shoulder width and the like as the known values through an operation on a not-illustrated user interface, and also has obtained the recognition result of the positions of the human body parts of the user from the human body recognizing unit 104. Then, the video presenting unit 109 calculates the positional relation (distance) between the video presenting unit 109 and the user in the real space, on the basis of both the obtained data.

More specifically, the video presenting unit 109 calculates the distance between the imaging unit 103 and the user by a known method such as the Newton method or the like. Here, it should be noted that the calculated distance is necessary to conform the distances between the head and the foot, the shoulders and the like on the image obtained as the recognition result to the actual height and the actual shoulder width of the user. Thus, since the positional relation between the half mirror 101 and the imaging unit 103 has been fixed, it is possible to obtain the positional relation (distance) between the half mirror 101 and the user in the real space. Therefore, it is also possible from these relations to calculate the position of the mirror image of the user on the half mirror 101.

Although a detailed description will be omitted because it can be calculated by a known method, the mirror image of the human body part of the user is reflected on the contact point of the joining line and the half mirror 101. Here, the joining line is the line which joins the user's viewpoint and the human body part of the virtual user image standing in back of the half mirror 101 at the same distance as that between the half mirror and the actual user, and the virtual user image faces the actual user. Then, when the position of the mirror image of the user on the half mirror 101 is obtained through the above calculation, the video presenting unit 109 adjusts the presentation position of the video so that the positions of both the shoulders of the person image in the presented sample video overlap both the shoulders of the mirror image of the user. That is, the presentation size and the presentation position of the video are changed. Thus, it is possible by the user's eyes to watch, from the own shoulder of the mirror image reflected in the half mirror 101, the state showing that the person serving as the sample moves up and down the arm. As a result, when the user oneself moves the arm, he/she can instinctively and instantaneously judge whether the own shoulder joint angle is within the maximum permissible shoulder joint angle presented by the sample. Therefore, for example, even if the physical therapist is not in attendance on the user, the user oneself can effortlessly exercise while watching his/her exercise achievement and appropriateness and judging a progress status based on the watched result.

Further, the video presenting unit 109 may obtain the two-dimensional visible image including the user from the imaging unit 103, and display the frame of the sample video so that the frame overlaps the obtained image. In this case, the video presenting unit 109 presents, by alpha blending, the video in which one or both of these images are made translucent and overlap each other. Furthermore, the video presenting unit may adjust the presentation positions and the presentation sizes of these images based on the recognitions of the positions of the human body parts, overlap the adjusted images each other to obtain the video, and then present the obtained video, so that the positions of the shoulders of the user and the person coincide with each other.

(Process)

Figure 3:
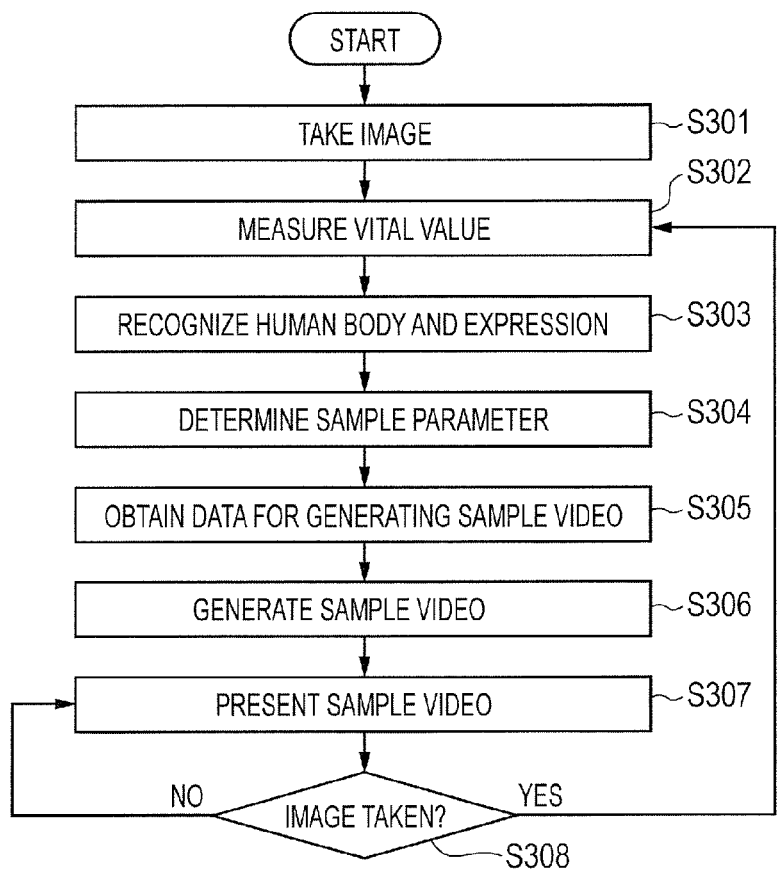
FIG. 3 is a flow chart for describing an example of a process procedure for generating a sample video in the first embodiment.

Subsequently, a process to be performed by the sample video generating apparatus 100 according to the present embodiment will be described with reference to a flow chart illustrated in FIG. 3. Incidentally, it is assumed in the following description that the user stands or sits in front of the half mirror 101 while facing the mirror before the process is started. Besides, it is assumed that the user performs the exercise of stretching the arm at the side from the put-down position and then extending the arm upward up to the extent which is reasonable for the user, while following the teaching of the physical therapist being in attendance on the user. Here, the pose of the user at this time is the reference pose in the rehabilitation exercise of the shoulder joint for the relevant user. In any case, when it is instructed through the operation of the user or the physical therapist on the user interface to take the image of the exercise while the user is performing the above exercise, the process in the present embodiment is started.

Initially, in a step S301, the imaging unit 103 takes the image of the user, and transfers the taken image to the human body recognizing unit 104 and the expression recognizing unit 105, and, in some cases, to the video presenting unit 109. Then, in a step S302, the vital measuring unit 102 measures the body temperature of the user standing in front of the half mirror 101, and transfers the information indicating the value of the measured body temperature to the sample parameter determining unit 106.

Next, in a step S303, the human body recognizing unit 104 recognizes the position of the human body part in regard to the image of the user taken by the imaging unit 103. Further, the expression recognizing unit 105 recognizes the expression in the image of the user taken by the imaging unit 103. Then, the recognition results are respectively transferred to the sample parameter determining unit 106.

Next, in a step S304, the sample parameter determining unit 106 determines the sample parameter. It is assumed in the following description that the sample parameter to be determined is the maximum permissible shoulder joint angle which is permitted for the user. Incidentally, when the sample parameter is determined, the information indicating the vital measurement value transferred from the vital measuring unit 102 in the step S302, the recognition result of the position of the human body part transferred from the human body recognizing unit 104 in the step S303, and the recognition result of the expression transferred from the expression recognizing unit 105 in the same step are used. Then, the determination result is transferred to the sample video generating unit 108.

Next, in a step S305, the sample video generating unit 108 obtains the data for generating the above-described sample video from the basic sample data holding unit 107. Then, in a step S306, the sample video generating unit 108 generates the sample video according to the above procedure, and transfers the generated sample video to the video presenting unit 109.

Next, in a step S307, the video presenting unit 109 displays the sample video transferred from the sample video generating unit 108. In this case, the video presenting unit may receive the person recognition result (i.e., the recognition result of the positions of the human body parts) from the human body recognizing unit 104, and adjust, based on the received person recognition result, the display position and the display size of the sample video transferred from the sample video generating nit 108. Alternatively, the video presenting unit may receive the image from the imaging unit 103, synthesize the received image and the sample video, and display the synthesis result.

Next, in a step S308, it is judged whether or not the image taking by the imaging unit 103 is instructed again. Then, when it is judged that the image taking is not instructed again, the process returns to the step S307 to continue displaying the sample video generated in the step S306.

On the other hand, when it is judged in the step S308 that the image taking by the imaging unit 103 is instructed again, the process returns to the step S302. Here, the case where the image taking by the imaging unit 103 is instructed again includes a case where it is explicitly instructed again after the step S301 by the operation of the user or the physical therapist on the user interface to take the image, and also includes a case where it is automatically instructed by the imaging unit 103 to take the image again. Further, the latter case further includes a case where it has been instructed by the explicit operation of the user or the physical therapist on the user interface to continuously take the images (i.e., moving image taking) and a case where the image taking is performed according to moving body detection (i.e., moving image taking while the user is exercising).

It should be noted that the explicit image re-taking by the operation of the user or the physical therapist on the user interface is performed in, for example, such a case where the user or the physical therapist determines that it is necessary to generate anew the sample video because the sample video based on the image taken in the step S301 is improper.

Besides, the case where the automatic image taking is performed by the imaging unit 103 is the case where the moving image is taken by the operation of the user or the physical therapist or the moving body detection. In this case, the process from the step S301 to the step S308 is repeated. Thus, the sample parameter is continuously determined based on the vital measurement value and the person recognition result every time the process in the step S304 is performed. As a result, the sample video is always changed according to the condition of the user who is exercising. Thus, even if the user who cannot physically follow the sample video forcedly follows the sample video, such an inappropriate exercise is detected in a moment on the basis of the vital measurement value and the person recognition result, whereby the sample video is immediately changed.

As described above, it is possible by the sample video generating apparatus 100 according to the present embodiment to generate and present the sample video of the rehabilitation exercise of the shoulder joint for the person who cannot freely rotate his/her shoulder due to the frozen shoulder, according to the ability and the condition of the user who performs the rehabilitation exercise.

In the present embodiment, the apparatus for generating the sample video of the rehabilitation exercise for the shoulder joint has been described. On another front, a similar apparatus may be applied to generate a sample video of another rehabilitation exercise. In particular, an apparatus for generating a sample video of a rehabilitation exercise for extending a range of motion of a joint such as an elbow, a knee or the like can be achieved by the constitution and the process which are substantially the same as those of the sample video generating apparatus 100 described in the present embodiment.

[Second Embodiment]

A sample video generating apparatus according to the second embodiment is provided on the assumption that it is placed in a rehabilitation room, a recreation room or the like of a day-care facility, a housing for the elderly or the like. More specifically, an aged person (hereinafter, called a user) who came to such a facility uses the sample video generating apparatus of the present embodiment under the teaching of a healthy exercise educator who is a facility staff. In the present embodiment, for example, a sample video showing a squat exercise for health maintenance and enhancement is generated and presented.

(Constitution)

Figure 4:
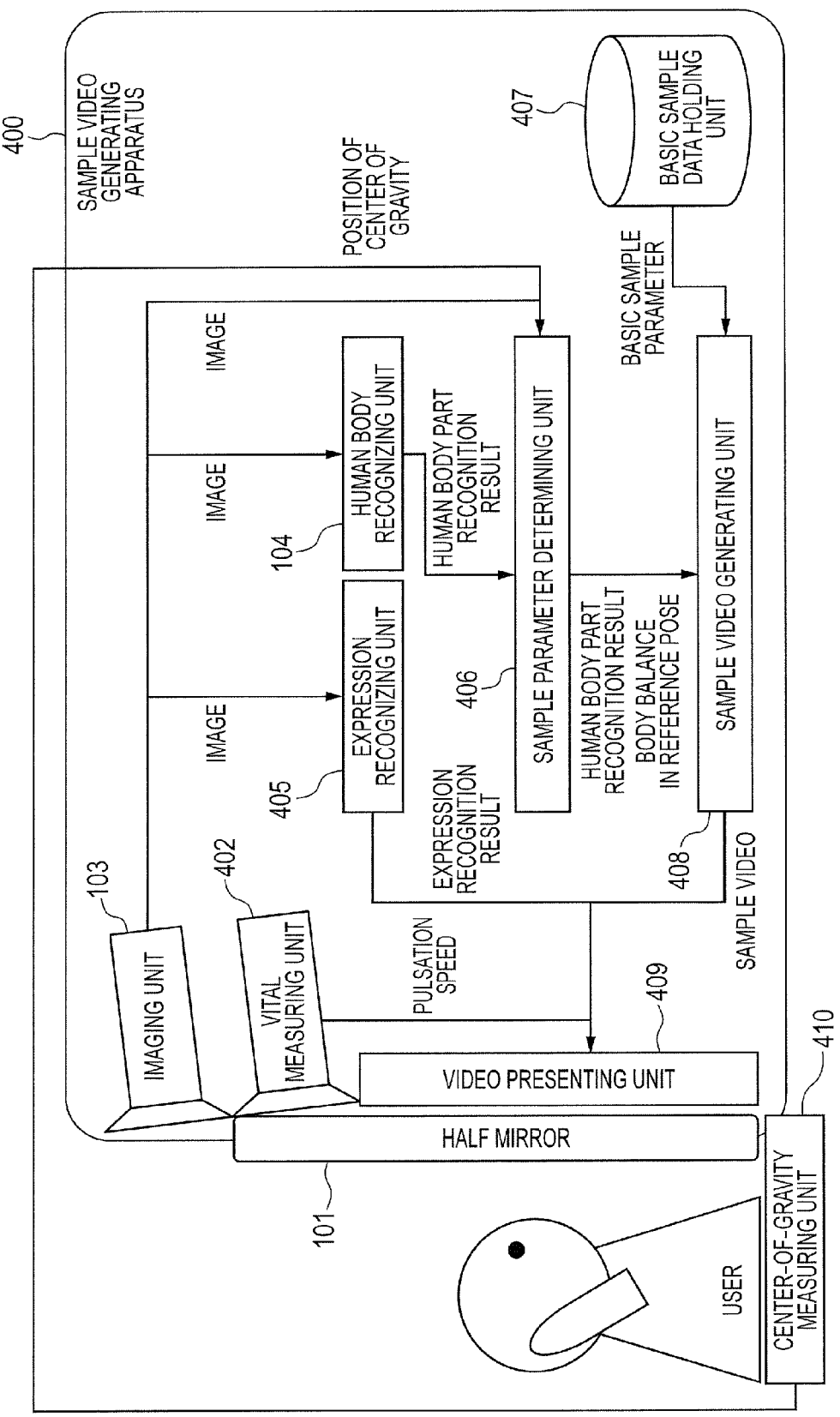
FIG. 4 is a block diagram illustrating an example of the constitution of a sample video generating apparatus according to the second embodiment of the present invention.

FIG. 4 is a block diagram illustrating an example of the constitution of a sample video generating apparatus 400 according to the present embodiment. Here, since the constitution of the sample video generating apparatus 400 illustrated in FIG. 4 is partially the same as that of the sample video generating apparatus 100 illustrated in FIG. 1, descriptions of the overlapped portions will be omitted hereinafter. That is, the sample video generating apparatus 400 according to the present embodiment comprises a half mirror 101, a vital measuring unit 402, an imaging unit 103, a human body recognizing unit 104 and an expression recognizing unit 405. Further, the sample video generating apparatus 400 comprises a sample parameter determining unit 406, a basic sample data holding unit 407, a sample video generating unit 408, a video presenting unit 409 and a center-of-gravity measuring unit 410.

The imaging unit 103 and a displaying apparatus of the video presenting unit 409 are disposed at the back of the half mirror 101. Thus, when the user stands in front of the half mirror 101, an image including a user's pose is taken by the imaging unit 103 through the half mirror 101. Further, a video on the video presenting unit 409 is presented to the user standing) in front of the half mirror 101 through this mirror.

The center-of-gravity measuring unit 410 is placed in front of the half mirror 101, and the user stands on the center-of-gravity measuring unit 410. Here, the center-of-gravity measuring unit 410, which is, for example, a plate-like device having a load sensor at each of its four corners, is used to measure the position of the center of gravity of the user standing thereon (that is, to measure the load center on the center-of-gravity measuring unit 410). Further, for example, a marker of which the shape has been already known is put on the center-of-gravity measuring unit 410. In this case, it is possible, by taking the put marker by the imaging unit 103 and analyzing the obtained image of the marker, to calculate a three-dimensional position of the center-of-gravity measuring unit 410 to the imaging unit 103 by a known method. Then, the center-of-gravity measuring unit 410 transfers information indicating the measured position of the center of gravity of the user to the sample parameter determining unit 406.

The vital measuring unit 402 is a sensor which measures, in a contactless manner, a vital value of the user standing in front of the half mirror 101. Here, it should be noted that the vital value in this case is indicated by, e.g., pulsation speed (i.e., speed of motion of the breast due to breathing). A sensor which measures the pulsation speed by detecting fluctuation of a reflecting wave signal of an electric wave emitted to the breast or the like is generally known as the sensor which measures the pulsation speed in the contactless manner. Therefore, the known sensor like this is used as the vital measuring unit 402 in the present embodiment. Then, the vital measuring unit 402 transfers information indicating the measured vital value to the video presenting unit 409.

The imaging unit 103 is a camera for taking an image of the whole body of the user standing in front of the half mirror 101. As the imaging unit, it may be possible to use a camera capable of taking a two-dimensional visible image, a camera capable of taking a three-dimensional distant image, or a camera capable of taking both two-dimensional and three-dimensional images. In response to an operation on a not-illustrated user interface, the imaging unit can explicitly take an image of the user's pose at a certain moment or continuously take images of the states of the user standing in front of the half mirror. Incidentally, the not-illustrated user interface is the same as that described in the first embodiment. Then, the imaging unit 103 transfers the taken image to the human body recognizing unit 104, the expression recognizing unit 405 and the sample parameter determining unit 406.

The human body recognizing unit 104 performs a recognition process concerning the person in the image transferred from the imaging unit 103. The recognition process concerning the person to be performed here is to recognize the position of the part of the human body of the person. In the present embodiment, the human body recognizing unit 104 recognizes the position of the part of the human body as a three-dimensional position to the imaging unit 103. Incidentally, when the two-dimensional visible image is received from the imaging unit 103, the human body recognizing unit recognizes the position of the part of the human body as a two-dimensional position. In any case, the process itself of recognizing the position of the part of the human body is the same as that described in the first embodiment. Then, the human body recognizing unit 104 transfers the recognition result to the sample parameter determining unit 406.

The expression recognizing unit 405 recognizes whether or not user feels fatigued, from the expression of the user standing in front of the half mirror 101. Further, when the user feels fatigued, the expression recognizing unit further recognizes how much the user feels fatigued.

In the recognition process, the expression recognizing unit first specifies an area where the image feature originating in the face of the user, from the image received from the imaging unit 103. Here, as the feature quantity of the image feature, the HOG feature quantity or the like may be used. Subsequently, the expression recognizing unit recognizes to which of a plurality of image groups including expressions respectively classified according to levels of fatigue and how much the image obtained by normalizing the specified area is similar. Here, the plurality of the image groups include images of collected expressions classified based on levels of fatigue such as an expression that a person feels fatigued extremely, an expression that a person feels fatigued to the extent that a rest is necessary, an expression that a person feels fatigued slightly, an expression that a person does not feel fatigued, and the like.

Besides, a judgment axis for sorting a face image group class corresponding to the expression that the person feels fatigued extremely and a face image group class corresponding to the expression that the person does not feel fatigued is previously formed using the LDA method. Then, it is judged by using the judgment axis to which class the normalized image area is similar. By repeatedly performing this process in regard to comparisons of a plurality of expression classes, it is possible to recognize to which of the expressions previously prepared by the levels of fatigue and how much the expression of the person in the image area received from the imaging unit 103 is similar.

Although the methods of recognizing the expressions that the persons feel fatigued have been described as above, the present invention is not limited to these methods. Namely, it may be of courser possible to use another known method. Then, the expression recognizing unit 405 transfers the recognition result to the video presenting unit 409.

The sample parameter determining unit 406 receives the taken image of the user standing in front of the half mirror 101 from the imaging unit 103, the recognition result of the human body part from the human body recognizing unit 104 and the information indicating the position of the center of gravity of the user from the center-of-gravity measuring unit 410, and then generates a parameter necessary for generating the sample video based on the received information.

For example, when a sample video showing a squat exercise for health maintenance and enhancement is generated and presented, information indicating physical balance in the reference pose of the squat exercise is generated as the parameter for generating the sample video. Here, the squat exercise is the exercise that the user repeatedly extends and contracts his/her knee from the upright pose, and the pose at the time when the user most bends the knee in the squat exercise is assumed as the reference pose in the present embodiment. Then, a relation between the position of the human body part such as the waist or the knee and the center-of-gravity line (i.e., the line extending upward from the position of the center of gravity along the vertical direction) of the user at that time is set as the parameter for the physical balance of the reference pose.

Figure 5A:
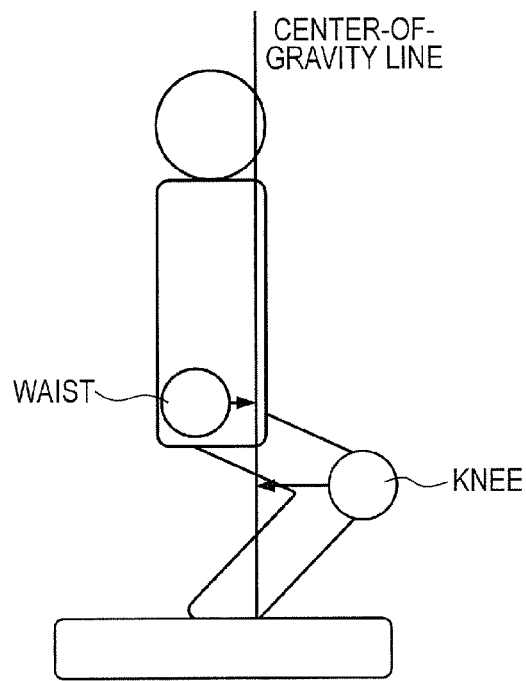
FIGS. 5A and 5B are diagrams respectively illustrating examples of reference poses of a squat exercise.
Figure 5B:
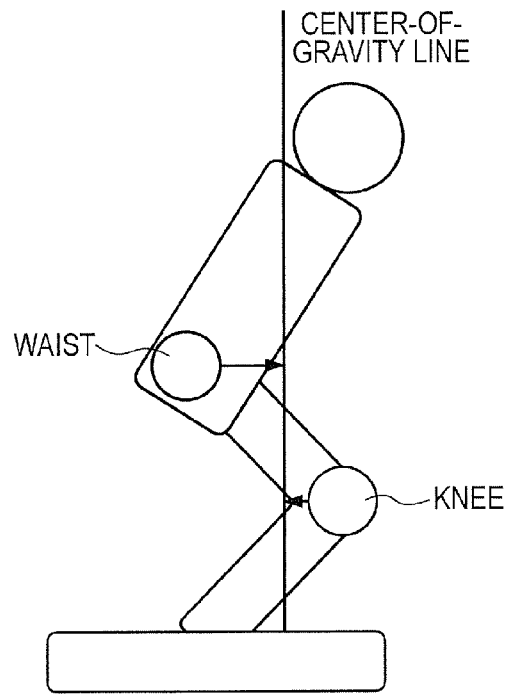

FIGS. 5A and 5B are diagrams respectively illustrating examples of the reference poses of the squat exercise and the parameters indicating the physical balance. More specifically, FIG. 5A illustrates the example of the reference pose that the user bends the knee while keeping his/her back straight, and FIG. 5B illustrates the example of the reference pose that the user bends the knee while bending his/her trunk forward. As illustrated in FIGS. 5A and 5B, the distance between the knee and the center-of-gravity line and the distance between the waist and the center-of-gravity line are used as the parameters indicating the physical balance.

Each of these distances is the two-dimensional distance on the image surface. As described above, the reference pose that the user should take is different according to the ability and the condition of the user. For example, it is effective for the person who does not have a pain in the knee to take the reference pose as illustrated in FIG. 5A for the purpose of health maintenance and enhancement, while it is better for the person who has a pain in the knee to take the reference pose as illustrated in FIG. 5B of bending the back forward to the extent that the person does not feel a pain. In any case, when the user actually performs the squat exercise, he/she is generally taught by the healthy exercise educator to take an intermediate reference pose as compared with the exemplified reference poses as illustrated in FIGS. 5A and 5B.

The sample parameter determining unit 406 calculates, as the sample parameter, the parameter indicating the physical balance of the user obtained when the pose of the user in the image taken by the imaging unit 103 is set as the reference pose. The sample parameter is calculated based on the recognition result of the position of the human body part received from the human body recognizing unit 104, the information indicating the position of the center of gravity received from the center-of-gravity measuring unit 410, and the image received from the imaging unit 103.

More specifically, the sample parameter determining unit 406 calculates the three-dimensional position and pose of the center-of-gravity measuring unit 410 to the imaging unit 103, from the marker of the center-of-gravity measuring unit 410 included in the image received from the imaging unit 103. Here, since a method of calculating such values is well known, a detailed description thereof will be omitted. Subsequently, the sample parameter determining unit calculates the three-dimensional position and pose of the center-of-gravity line (i.e., the line extending upward from the position of the center of gravity along the vertical direction) of the user, from the three-dimensional position and pose of the center-of-gravity measuring unit 410 to the imaging unit 103 and the position of the center of gravity being the measurement result of the center-of-gravity measuring unit 410. In this case, it is assumed that the relation between the imaging unit 103 and the vertical direction (gravity direction) has been known. Subsequently, the sample parameter determining unit calculates the parameter of the physical balance (i.e., the distance between each human body part and the center-of-gravity line) by using the three-dimensional position of the human body part of the user to the imaging unit 103 received from the human body recognizing unit 104 and the three-dimensional position and pose of the center-of-gravity line of the user to the imaging unit 103. Then, the sample parameter determining unit 406 transfers the calculated parameter of the physical balance to the sample video generating unit 408, and also transfers the recognition result of the position of the human body part received from the human body recognizing unit 104 to the sample video generating unit 408.

The basic sample data holding unit 407 holds and stores therein a plurality of basic sample parameters which serve as the basis of the sample video to be presented to the user. In the present embodiment, the basic sample data holding unit holds the two kinds of basic sample parameters, i.e., a parameter indicating the squat exercise that the physical balance of the reference pose is as illustrated in FIG. 5A, and a parameter indicating the squat exercise that the physical balance of the reference pose is as illustrated in FIG. 5B.

Here, in the parameter indicating the squat exercise, the three-dimensional positional parameters of the human body parts of the human body model performing the squat exercise are arranged in chronological order. In addition, the parameter indicating the basic sample includes the parameter indicating the position of the center-of-gravity line at the time of the exercise. These parameters may be created by a known method. That is, for example, the human body part positions obtained by taking the two kinds of squat exercises of the person may be set as the parameters indicating the squat exercise. At this time, if the actual position of the center of gravity of the person is measured, the measurement result is used as the parameter indicating the position of the center-of-gravity line. The obtained two kinds of basic sample parameters are referred by the sample video generating unit 408. Incidentally, the two kinds of basic sample parameters are represented as the three-dimensional coordinates, and the center-of-gravity lines of the respective reference poses have been normalized to be on the same position.

The sample video generating unit 408 receives the parameter indicating the physical balance of the reference pose from the sample parameter determining unit 406, refers to the basic sample parameter from the basic sample data holding unit 407, and generates the sample video by using both the parameters.

First, the sample video generating unit 408 corrects the position of the human body part indicated by the referred basic sample parameter from the basic sample data holding unit 407, so as to conform to the recognition result of the position of the human body part received from the sample parameter determining unit 406. That is, the position of the human body part indicated by the basic sample parameter is corrected so that the distance between the linked human body parts (the shoulder and the elbow, the waist and the knee, or the like) comes to be relatively the same as the recognition result of the position of the human body part received from the sample parameter determining unit 406. Thus, the proportion of the human body part indicated by the basic sample parameter conforms to the proportion of the image of the user taken by the imaging unit 103. Further, the correction result thereof is reflected in the parameter indicating the position of the center-of-gravity line on a simulation basis. For example, with respect to the position of the human body part indicated by the basic sample parameter, a difference between the average position before the correction and the average position after the correction is directly applied to the position of the center-of-gravity line.

Subsequently, the sample video generating unit 408 calculates the parameter of the physical balance from the position of the human body part to the reference pose indicated by the two kinds of basic sample parameters after the correction. As a result, the sample video generating unit 408 obtains the three parameters of the physical balance, i.e., the parameter of the physical balance obtained from the sample parameter determining unit 406 and the two parameters of the physical balance obtained from the two kinds of basic sample parameters.

Here, it is assumed that the shortest distance of the line connecting the knee and the center-of-gravity line indicated in the physical balance obtained by the sample parameter determining unit 406 on the image surface is dx, and the distances of the shortest lines connecting the two knees and the center-of-gravity line indicated in the two kinds of sample videos on the image surface are respectively da and db. At this time, the distance da corresponds to the basic pose illustrated in FIG. 5A, and the distance db corresponds to the basic pose illustrated in FIG. 5B.

When the physical balance obtained by the sample parameter determining unit 406 is the intermediate pose of the physical balance illustrated in FIG. 5A and the physical balance illustrated in FIG. 5B, the relation of distance da>distance dx>distance db is satisfied. In this case, the sample video generating unit 408 sums up the position coordinates of the knee parts indicated in the two kinds of basic sample parameters at a rate of (distance dx−distance db): (distance da−distance dx). Thus obtained distance of the shortest line connecting the position coordinates and the center-of-gravity line on the image surface is the distance dx.

For example, it is assumed that the image surface is Z=0, the position coordinates of the knee parts indicated in the two kinds of basic sample parameters are respectively A(3, 1, 4) and B(1, 3, 0), and the distance dx indicated in the physical balance obtained from the sample parameter determining unit 406 is 2. At this time, when the center-of-gravity line is X=Z=0, the distance da=3 and the distance db=1, whereby (distance dx−distance db):(distance da−distance dx)=1:1 is obtained. Thus, if the position coordinates A and B are summed up at the rate of 1:1, then (3, 1, 4)×0.5+(1, 3, 0)×0.5= (2, 2, 2) is obtained. The distance of the shortest line connecting the relevant coordinates and the center-of-gravity line X=Z=0 on the image surface is 2, and this conforms to the distance dx.

The sample video generating unit 408 sets thus obtained position coordinates as the position coordinates of the knee in the sample video. Likewise, the sample video generating unit 408 determines the rate of the summing to another human body part, and calculates the position coordinates thereof in the sample video. Then, the sample video generating unit 408 applies the rate of the summing determined for each human body part to all the two kinds of basic sample parameters. Thus, it is possible to obtain the parameter indicating the squat exercise which conforms to the pose of the user which is obtained by summing up the squat exercises indicated by the two kinds of basic sample parameters and of which the physical balance at the reference pose is taken by the imaging unit 103. The sample video generating unit 408 generates a CG video serving as the sample video by applying thus obtained parameter to the human body model.

Incidentally, the example of determining the rate of summing up the two kinds of basic sample parameters for each human body part has been described. However, for example, a certain rate may be applied to all the human body parts, and an average of the rates of the summing may be applied to all the human body parts. Further, it may be possible not to sum up the two kinds of basic sample parameters but to sum up three or more kinds of basic sample parameters. The sample video generating unit 408 transfers the sample video generated by the above procedure to the sample video presenting unit 409.

The video presenting unit 409 receives the sample video from the sample video generating unit 408, and presents (displays) the received sample video. Since the video presenting unit 409 is disposed in back of the half mirror 101, the user standing in front of the half mirror 101 watches the sample video overlapping the mirror image including the user oneself in the half mirror 101.

Further, the video presenting unit 409 receives the information indicating the pulsation speed being the vital measurement value from the vital measuring unit 402, and also receives the recognition result of the expression of the user from the expression recognizing unit 405. Here, the recognition result of the expression indicates a fatigue degree of the user. Then, the video presenting unit 409 changes a displaying time of the sample video to be presented to the user, according to the pulsation speed and the fatigue degree. That is, when the received pulsation speed is faster than the pulsation speed of the normal squat exercise previously set, the displaying time of the sample video to be presented to the user is shortened. Likewise, when the fatigue degree of the user indicated by the received recognition result of the expression is high, the displaying time of the sample video to be presented to the user is shortened, or the presentation of the sample video is stopped depending on the degree.

(Process)

Figure 6:
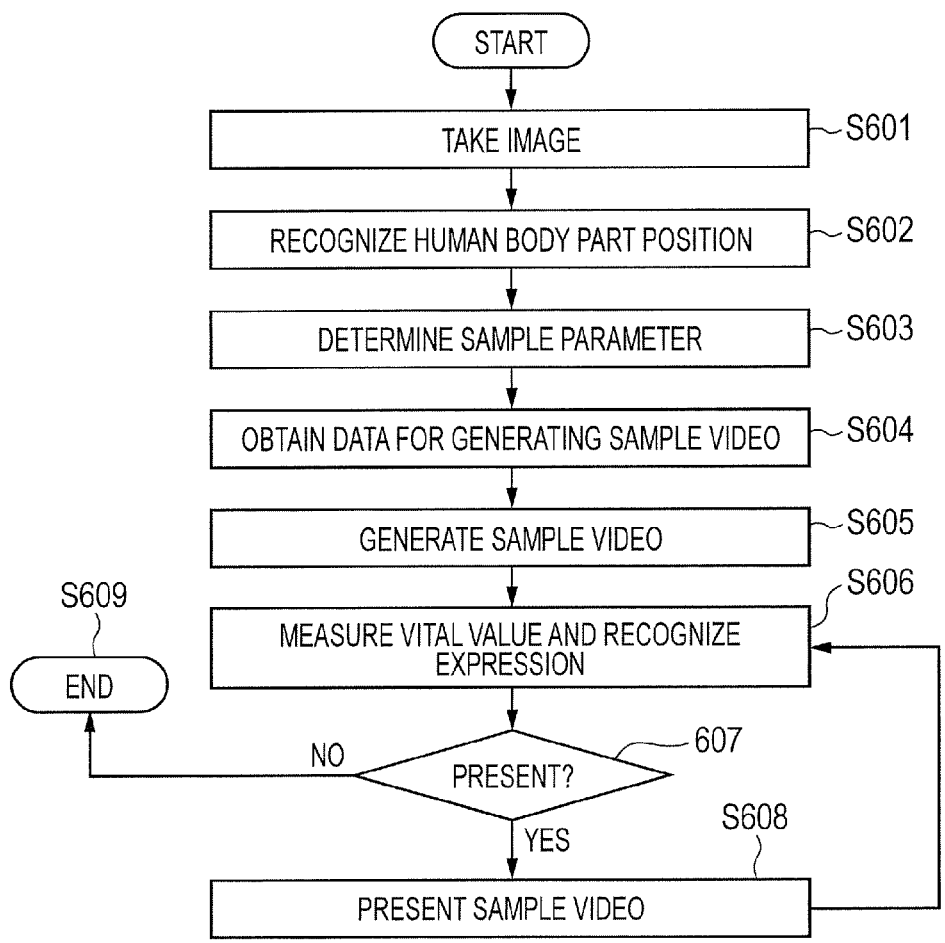
FIG. 6 is a flow chart for describing an example of a process procedure for generating a sample video in the second embodiment.
Figure 7:
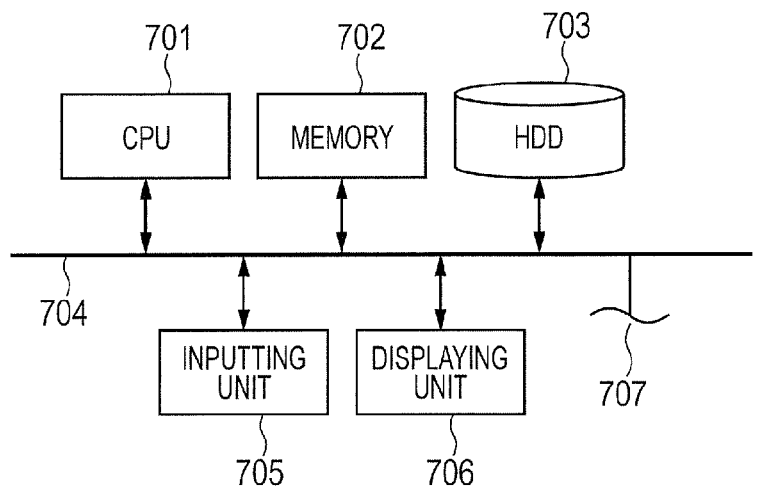
FIG. 7 is a block diagram illustrating an example of a hardware constitution according to other embodiments of the present invention.

Subsequently, a process to be performed by the sample video generating apparatus 400 according to the present embodiment will be described with reference to a flow chart illustrated in FIG. 6. Incidentally, it is assumed in the following description that the user stands on the center-of-gravity measuring unit 410 placed in front of the half mirror 101 before the process is started. On this occasion, the user may stand sideways at the imaging unit 103 or stand while facing the imaging unit 103. Further, it is assumed that the user takes the reference pose in the squat exercise under the teaching of the healthy exercise educator who is in attendance on the user, and it is also assumed that the pose of the user based on the teaching of the healthy exercise educator is the reference pose in the squat exercise which is suitable for the ability and the condition of the user, which does not strain the user's body, and by which it is possible to expect a proper exercise effect. In any case, when it is instructed through the operation of the user or the healthy exercise educator on the user interface to take the image while the user is taking the basic pose (reference pose), the process in the present embodiment is started.

Initially, in a step S601, the imaging unit 103 takes the image of the user, and transfers the taken image to the human body recognizing unit 104 and the sample parameter determining unit 406.

Next, in a step S602, the human body recognizing unit 104 performs the person recognition process to the image of the user taken by the imaging unit 103. Here, the person recognition process is the process of recognizing the positions of the human body parts. Then, the human body recognizing unit 104 transfers the recognition result to the sample parameter determining unit 406.

Next, in a step S603, the sample parameter determining unit 406 determines the sample parameter. In the present embodiment, the sample parameter is the parameter indicating the physical balance in the pose of the user taken in the step S601. Incidentally, when the sample parameter is determined, the information indicating the recognition result transferred from the human body recognizing unit 104 in the step S602 is used. Then, the sample parameter determining unit 406 transfers the determination result to the sample video generating unit 408.

Next, in a step S604, the sample video generating unit 408 obtains the data (basic sample parameter) for generating the sample video from the basic sample data holding unit 407. Then, in a step S605, the sample video generating unit 408 generates the sample video according to the above procedure, and transfers the generated sample video to the video presenting unit 409.

Next, in a step S606, the vital measuring unit 402 measures the pulsation speed of the user standing in front of the half mirror 101, and the expression recognizing unit 405 recognizes the expression of the user in the image taken by the imaging unit 103. Then, the vital measuring unit 402 and the expression recognizing unit 405 transfer the respective results to the video presenting unit 409. Subsequently, the displaying time of the sample video is determined by the video presenting unit 409. A method of determining the displaying time of the sample video will be described later.

Next, in a step S607, the video presenting unit 409 judges whether or not to present the sample video received from the sample video generating unit 408. Such a judgment is performed based on whether or not the sample video is displayed as long as the defined displaying time. Then, when it is judged that the sample video is displayed as long as the defined displaying time, the process advances to a step S609, whereby the entire process is terminated.

On the other hand, when it is judged in the step S607 that the sample video is not displayed as long as the defined displaying time, the video presenting unit 409 presents (displays) the sample video as it is in a step S608, and the process returns to the step S606.

Here, the defined displaying time of the sample video may be changed based on the measurement value of the pulsation speed of the user and the recognition result of the expression of the user both transferred to the video presenting unit 409. For example, when the measurement value of the pulsation speed of the user is substantially equal to or lower than previously set pulsation speed in a normal squat exercise and the fatigue degree of the user indicated in the recognition result of the expression is low, the normal defined displaying time is used as it is.

On the other hand, when the measurement value of the pulsation speed of the user is higher than the previously set pulsation speed in the normal squat exercise or the fatigue degree of the user indicated in the recognition result of the expression is high, the displaying time of the sample video is shortened according to the measurement value of the pulsation speed or the recognition result of the expression. As just described, in the step S606, the displaying time of the sample video is adjusted according to the measurement value of the pulsation speed or the recognition result of the expression. Thus, when the user feels fatigued excessively or the user's breath is made shorten in the squat exercise, the displaying time of the sample video is shortened or the presentation itself of the sample video is suddenly terminated. Therefore, it is possible to present the sample video having a reasonable length in conformity with the condition of the user.

As described above, it is possible by the sample video generating apparatus 400 according to the present embodiment to generate the sample video showing the pose of the user according to the ability of the user who performs the squat exercise by which the health maintenance and enhancement is achieved for the aged person. Further, it is also possible to present the above sample video with the length according to the condition of the user who is performing the squat exercise.

Incidentally, the apparatus for generating the sample video of the squat exercise has been described in the present embodiment. On another front, a similar apparatus may be applied to generate a sample video of another rehabilitation exercise. In particular, an apparatus for generating a sample video of an exercise in which there are variations in physical balance in motion can be achieved by the constitution and the process which are substantially the same as those of the sample video generating apparatus 400 described in the present embodiment.

[Other Embodiments]

Also, it is possible to achieve the present invention by performing a process in which software (program) for achieving the functions of the above-described embodiments is supplied to a system or an apparatus through a network 704 or 707 and/or various storage media 702 and 703, and a CPU 701 in the system or the apparatus reads and executes the supplied program. Moreover, it may be possible to provide the program by storing it in a computer-readable storing medium. Incidentally, it may be possible to input from an input unit 705 the instruction for performing the process to the computer in the apparatus of the present invention, and display a result of the instructed process on a displaying unit 706.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-263512, filed Dec. 1, 2011, which is hereby incorporated by reference herein in its entirety.

What is claimed is:

1. A video generating apparatus comprising:
   an obtaining unit configured to obtain an image at a time when a person moves a specific part of a human body;
   a human body recognizing unit configured to recognize a position of the specific part of the human body in the image;
   a holding unit configured to hold data concerning a basic video showing exercises;
   a setting unit configured to set a motion range that moves the specific part of the human body when the person performs an exercise using a video on the basis of a recognition result of the human body recognizing unit;

a video generating unit configured to generate, based on the motion range set for the specific body part and from the data concerning the basic video, a sample video for the person to show the exercise; and a display controlling unit configured to display the generated sample video on a displaying apparatus.

2. The video generating apparatus according to claim 1, further comprising:

an information inputting unit configured to input information concerning a condition of the person in the image; and a range adjusting unit configured to adjust the motion range on the basis of the input information concerning the condition of the person, wherein the video generating unit generates the sample video for the person from the data concerning the basic video, on the basis of the adjusted motion range.

3. The video generating apparatus according to claim 2, wherein the information inputting unit further comprises an expression recognizing unit configured to recognize an expression of the person in the image.

4. The video generating apparatus according to claim 3, wherein the expression recognizing unit recognizes a pain of the person in the image from the expression of the person, and the range adjusting unit adjusts the motion range based on an extent of the recognized pain.

5. The video generating apparatus according to claim 2, wherein the information inputting unit further comprises a vital measuring unit configured to measure a vital value of the person in the image, and the range adjusting unit adjusts the motion range on the basis of the measured vital value.

6. The video generating apparatus according to claim 2, wherein the information inputting unit inputs elapsed days from starting of the exercise of the person in the image, and the range adjusting unit adjusts the motion range on the basis of the elapsed days.

7. The video generating apparatus according to claim 1, further comprising a half mirror placed in front of the displaying apparatus, wherein the display controlling unit displays, on the basis of a recognition result by the human body recognizing unit, the sample video so that a person in the half mirror and the person in the sample video correspond to each other.

8. The video generating apparatus according to claim 1, wherein the video generating unit generates the sample video by extracting, from the basic video, the video showing that the person exercises in the motion range.

9. The video generating apparatus according to claim 1, wherein the data concerning the basic video held by the holding unit includes motion data, and the video generating unit generates the sample video by extracting motion data of the motion range from the held motion data and applying the extracted motion data to a human body model.

10. The video generating apparatus according to claim 2, further comprising a time adjusting unit configured to adjust a display time of the sample video to be displayed on the displaying apparatus, on the basis of information concerning a condition of the person input by the information inputting unit.

11. The video generating apparatus according to claim 10, wherein the information inputting unit further comprises an expression recognizing unit configured to recognize an expression of the person in the image, and the time adjusting unit adjusts the display time of the sample video on the basis of the expression recognized by the expression recognizing unit.

12. The video generating apparatus according to claim 11, wherein the expression recognizing unit recognizes fatigue of the person from the expression of the person in the image.

13. The video generating apparatus according to claim 10, wherein the information inputting unit further comprises a vital measuring unit configured to measure a vital value of the person in the image, and the time adjusting unit adjusts the display time of the sample video on the basis of the vital value measured by the vital measuring unit.

14. The video generating apparatus according to claim 13, wherein the vital measuring unit measures a heart rate of the person in the image.

15. The video generating apparatus according to claim 1, further comprises a center-of-gravity measuring unit configured to measure a position of the center of gravity of the person, wherein the video generating unit generates the sample video on the basis of the position of the center of gravity measured by the center-of-gravity measuring unit.

16. The video generating apparatus according to claim 1, wherein the holding unit holds a plurality of parameters respectively representing the exercises as the data concerning the basic video showing that the person exercises.

17. A video generating method in a video generating apparatus which is equipped with a holding unit configured to hold data concerning a basic video showing exercises, the method comprising:

obtaining an image at a time when a person moves a specific part of a human body;

recognizing a position of the specific part of the human body in the image;

setting a motion range that moves the specific part of the human body when the person performs an exercise using a video on the basis of a recognition result of recognizing the human body;

generating, based on the motion range set for the specific body part and from the data concerning the basic video, a sample video for the person to show the exercise; and displaying the generated sample video on a displaying apparatus.

18. A non-transitory computer-readable storage medium storing a computer program for controlling a video generating apparatus which is equipped with a holding unit configured to hold data concerning a basic video showing exercises, the program causing a computer to perform:

an obtaining step of obtaining an image at a time when a person moves a specific part of a human body;

a human body recognizing step of recognizing a position of the specific part of the human body in the image;

a setting step of setting a motion range that moves the specific part of the human body when the person performs an exercise using a sample video on the basis of a recognition result of the human body in the recognizing step;

a video generating step of generating, based on the motion range set for the specific body part and from the data concerning the basic video, a sample video for the person to show the exercise; and a display controlling step of displaying the generated sample video on a displaying apparatus.

19. The video generating apparatus according to claim 1, wherein the motion range is a range of the movement of the specific part permitted by the person.

20. The video generating apparatus according to claim 1, wherein in the basic video, information related to the motion range is associated with each frame, and the video generating unit generates the sample video for the person to show the exercise on the basis of the motion range set by the setting unit and the information related to the motion range associated with each frame of the basic video.

\* \* \* \* \*